Oct. 30, 1962   R. WESTFALL   3,060,584
VERNIER CALIPER
Filed Feb. 26, 1958
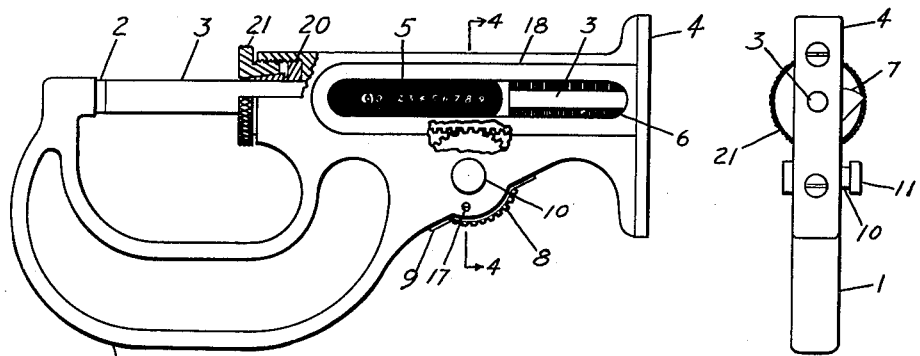
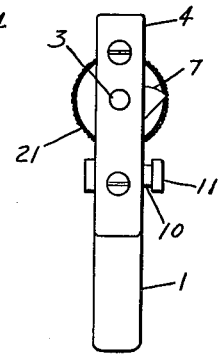
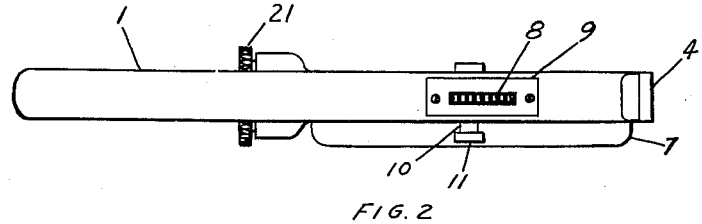
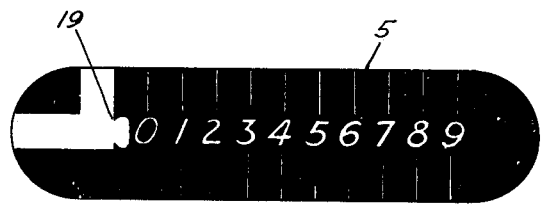
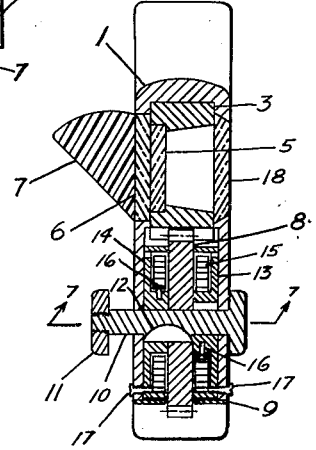
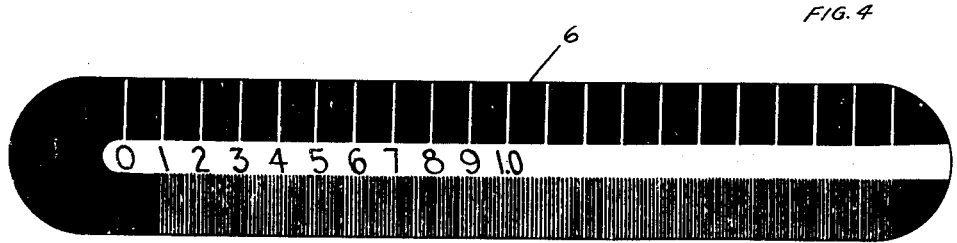
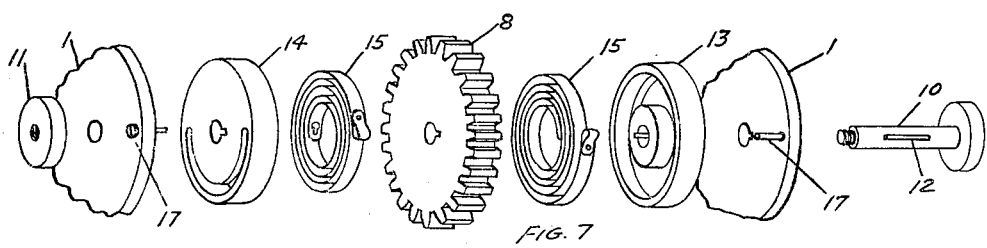

United States Patent Office 3,060,584
Patented Oct. 30, 1962

---

3,060,584
VERNIER CALIPER
Robert Westfall, Gates, N.Y.
(160 Northmore Ave., Rochester 6, N.Y.)
Filed Feb. 26, 1958, Ser. No. 717,702
12 Claims. (Cl. 33—143)

This invention relates to measuring and indicating devices and more particularly to calipers, one object of the invention being to provide an improved device of this nature having a construction insuring materially increased accuracy and legibility over an expanded range of dimensional readings.

Another object is to provide such a device, in a normal and practicable size, with vernier type expanded scales in a direct reading decimal system capable of being easily read to a plurality of decimal places.

Another object is the provision of a device of the above character employing vernier means of the extinction type with its increased accuracy due to the blanking out of all but the proper reading.

Another object is to provide a device of the character described which can be quickly adjusted to any dimension within its range.

Another object is to provide a caliper device having a constant axial load on the measuring element or spindle, to improve the accuracy and repeatability of readings.

Another object is to supply a caliper with measuring means which are not subject to the wear, lost motion and loss of accuracy characteristic of the screw and nut measuring means of prior calipers.

Another object is to provide a caliper having adaptable means for making measurements of dimensions in the nature of diameters and also for making depth measurements, with constant axial load on the measuring element in both adaptations.

Another object is the provision of a caliper capable of being operated without any axial thrust on the measuring element, for measuring delicate parts.

Still a further object is to provide a caliper having efficient locking means for the measuring element, to retain its settings and indicated measurements.

To these and other ends the invention resides in certain improvements and combinations of parts, all as will be hereinafter more fully described, the novel features being pointed out in the claims at the end of the specification.

In the drawings:

FIG. 1 is a plan view of a caliper embodying the present invention, partly in section and partly broken away, to show locking means for the measuring spindle and means for moving the spindle to make measurements;

FIG. 2 is a side elevation of the instrument;

FIG. 3 is an end elevation of the same;

FIG. 4 is an enlarged, sectional view on the line 4—4 in FIG. 1;

FIG. 5 is an enlarged view of vernier scales employed in the instrument;

FIG. 6 is an enlarged view of the major scales on the stationary part or frame of the caliper, and FIG. 7 is an enlarged, exploded, perspective view of means for moving the measuring spindle and controlling the spring tensions thereon.

The embodiment of the invention herein disclosed by way of illustration preferably comprises a vernier caliper having a frame 1 of substantially C-shape at one end to support a reference surface in the nature of an anvil 2 for diameter measurement and the like and shaped at its other end to provide a reference surface suitable for depth measurements. The intermediate portion of the frame is formed to provide a housing for supporting the measuring element or spindle 3 and also the vernier indicating means hereafter described.

The housing portion of the frame is formed internally with guideways, as indicated in FIGS. 1 and 4, for supporting and guiding both the cylindrical portions of the measuring spindle and a central enlargement thereof which carries the vernier scales, as shown in FIG. 4.

The central enlargement of the spindle in the housing is of the generally rectangular shape in cross section shown in FIG. 4, while both ends of the spindle are cylindrical in shape, one cooperating with the anvil 2 and the other, of reduced diameter sliding through an opening in a reference surface 4 as shown in FIG. 3, for making depth measurements.

The intermediate portion of the spindle is of the generally rectangular shape shown in FIG. 4 with a central opening in which is cemented a transparent glass plate insert 5 carrying a plurality of vernier scales and numerical indications as shown in FIG. 5. The frame housing has a sight opening for reading the indicating scales, as shown in FIG. 1, and has cemented therein a transparent glass plate insert 6 which carries the plurality of major scales and numerical designations shown in FIG. 6. Such vernier and major scales are positioned in intimate contact with each other for accuracy in reading. Cemented to the glass insert 6 is a glass or plastic illuminating means 7 comprising an outer portion of object lens curvature and an inner plane reflecting surface, for gathering and reflecting light through the scales as they are read through the sight opening.

The means for manually sliding the measuring spindle longitudinally in its guideway in the housing preferably comprises a series of rack teeth along the bottom of the enlarged intermediate portion of the spindle as shown in FIGS. 1 and 4, these teeth meshing with the teeth of a member or gear 8 rotatably mounted in the frame. A peripheral portion of gear 8 protrudes through a cover plate 9 (FIGS. 1 and 4) for rotation by the operator's thumb to slide the spindle.

Gear 8 is carried by a shaft 10 which is mounted to rotate and slide longitudinally in bearings in the frame, as shown assembled in FIG. 4 and exploded in FIG. 7. The shaft has a screw cap 11 at one end and an enlarged head at the other and carries near its center a key 12 for a purpose which will now be described.

The spindle is provided with spring means for yieldably actuating it in either of opposite directions, to provide essentially constant axial pressure or load on the spindle and eliminate the inaccuracies due to variations in the pressure with which the instrument is applied to objects to be measured, in addition to errors due to wear, which are characteristic of the screw and nut spindle actuating means of prior calipers. To this end shaft 10 carries a pair of similar spring housings 13 and 14 (FIGS. 4 and 7) on opposite sides of gear 8. A coiled clock spring 15 is mounted in each housing with one end fastened to its housing by a pin 16. The other end of each spring 15 is fixed to a screw 17 inserted through the frame and through semi-circular slots in the spring housings 13 and 14 for engagement with the loops at the outer ends of the springs. These parts are shown in exploded relation to one another in FIG. 7. Spring housings 13 and 14 are rotatable on shaft 10 except when keyed to it by sliding it longitudinally to connect the housings through the shaft to gear 8 and spindle 3 as hereafter described.

A cover glass 18 is slidably inserted in the sight opening of the housing and retained in place by the reference surface plate 4 secured to the housing by screws, as shown in FIG. 3.

Means are provided for locking or clamping the measuring spindle in adjusted position in its housing, preferably comprising a split, tapered collet 20 threaded permanently into one end of the housing about spindle 3, as shown in FIG. 1. A tapered lock ring 21 is likewise threaded into the housing around the spindle 3 to provide a collet type lock for clamping the spindle by rotating ring 21, in any position to which the spindle has been moved in making the measurement.

When operating as a caliper for measuring dimensions, such as diameters, spindle 3 is retracted from anvil 2 by rolling the thumb over gear 8, meshing with the spindle, until the part to be measured fits between the anvil 2 and spindle 3, within the outline of the C-shaped portion of the frame. As gear 8 is rotated, spring 15 in housing 14 is wound more tightly, the gear 8 and spring housing 14 being then keyed to the common shaft 10 in its longitudinal adjusted position shown in FIG. 4. Hence the spindle 3 is opened against the pressure of the spring and closes on the part to be measured on the side opposite the anvil 2, by the same spring pressure.

The plurality of stationary major scales, two in the present instance, are shown in FIG. 6, comprising an upper scale having coarse or larger subdivisions and a lower scale spaced therebelow having fine or smaller subdivisions. These scales are marked on the translucent glass plate by translucent lines formed in any known manner in an opaque coating or other background on the plate, with the space between the scales left translucent for the reception of opaquely marked numerical scale designations in tenths of an inch, as shown. While a scale of one inch length is here shown, a scale of longer length could be obviously employed.

The vernier also comprises a plurality of scales, two in the present instance, one for cooperation with each of the major scales described above. These vernier scale subdivisions are marked as translucent lines in an opaque coating or background on the plate 5, being spaced apart with translucent numerical designations therebetween, as shown. The vernier operates on the known principle, that is, of two lengths of equal distance on a major scale and its cooperating vernier scale, such distance on the vernier scale is subdivided into ten parts corresponding to a subdivision of nine parts in the same distance on the major scale, so that by moving the vernier scale 1/10 of a subdivision of the major scale, the graduations numbered 1 are brought into coincidence and so on for the remaining graduations, as well understood in the art, the subdivisions of the vernier scale thus being different in length from the subdivisions of the cooperating major scale, or multiples thereof, by amounts which are the increments to be measured.

Observing the superimposed scales by the light transmitted therethrough, three bright lines are visible, representing the three digits required for readability to one thousandth of an inch. Referring to FIG. 1, and its zero setting as typical, the first tenth of an inch digit is the upper left bright line above the opaque or black numeral "0." The second, or hundredths of an inch digit, is the upper right bright line above the clear numeral "0." The third or thousandths of an inch digit, is the bright line below the clear numeral "0." The reading, therefore, is 0.000 for this closed setting of the caliper and similarly for other readings for other settings. For a given measurement the tenths digit will always be the black numeral below the bright line appearing at the left of the clear index area 19 (FIGS. 1 and 5). The hundredths digit will be the clear numeral below the upper bright line. The thousandths digit will be the clear numeral above the lower bright line.

When operated as a depth caliper, gear 8 is rotated by the thumb to the limit of travel of measuring spindle 3, to the right in FIG. 1, and in this instance, a setting of one inch. With the spindle 3 in this fully retracted position with respect to anvil 2, the cap 11 of shaft 10 is pressed inwardly from the position shown in FIGS. 2 to 4, inclusive, until it rests against the side of frame 1, thereby sliding the shaft 10 inwardly and sliding its key 12 into the keyway in spring housing 13 and so disengaging the key from spring housing 14. The pressure of the spring in this housing 13 is thus applied in the opposite direction to measuring spindle 3. The reaction of spindle 3 from anvil 2 as described above, projects the smaller cylindrical section at the right end of spindle 3 out beyond the reference surface 4 and the pressure of the spring, adjusted as described above, tends to maintain this end of the spindle extended for a distance of one inch beyond the reference surface of plate 4. The caliper is held with the plate 4 against the outer surface of the part to be measured in the conventional manner, the spring providing substantially constant pressure throughout the range of positions to which the spindle may be pressed inwardly by the inner or depth surface of the part to be measured. The hundredths and thousandths of vernier indications are then read in the same manner as described above, to indicate the depth measurement.

If at any time additional pressure is desired in either use of the caliper, this may be applied by the thumb to gear 8 without affecting the parts responsible for the accuracy of the extinction vernier readings. If it is desired to eliminate the spring pressure in both directions of movement of the element 3, as in measuring delicate objects, this may be done when element 3 is in its open position, spaced from anvil 2 by moving shaft 10 longitudinally until it is centered in frame 1. In this position, its key 12 engages both spring housings 13 and 14 so that the springs operate in opposite directions, one spring counteracting and neutralizing the pressure of the other.

When it is desired to lock the measuring spindle 3 at any given or adjusted setting, lock ring 21 is turned until it tightens against the split tapered collet 20 which in turn grips spindle 3 and maintains it in position.

It is apparent from the above description that the invention provides, in a caliper of normal size, a materially increased and high degree of legibility of its indicating means and accuracy of the readings over an expanded range of precision. The caliper comprises expanded scales in a direct reading decimal system adapted to be rapidly and accurately read to each decimal place. The measuring spindle is quickly and conveniently adjusted to any dimension within the range for which the caliper may be constructed. The measuring element may be moved by the application to it of a constant axial load which improves the accuracy of its indications and the means for moving the spindle are not subject to the wear, lost motion and loss of accuracy to which conventional calipers have heretofore been subject. The caliper embodies a highly useful combination, with the same legible and accurate indicating means, of both a depth gauge and a gauge for measuring diametrical and similar dimensions, with means for eliminating the spring load on the measuring spindle for measuring delicate parts and means for locking the spindle in any position, so as to adapt the instrument for a wide range of utility.

Subject matter disclosed but not claimed herein is claimed in my copending application, Serial No. 678,276, filed August 15, 1957, Measuring and Indicating Device With Extinction Type Vernier.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A caliper comprising a frame having a reference surface, a housing on said frame formed with a guideway therein, a measuring element slidable in said guideway for movement of an end thereof toward and from said surface, manually operable means on said frame for moving said element in said frame guideway, and linear, superposed, light transmitting vernier scales of the extinction type fixed on said element and housing and cooperating directly with one another for indicating the movement of said element.

2. A caliper comprising the combination specified in claim 1 in which said element is of elongated shape aligned with said surface and said frame has a manually engageable rotatable member for sliding said element toward and from said surface.

3. A caliper comprising the combination specified in claim 1 in which said element is provided with spring means in said housing for slidably moving said element toward said surface.

4. A caliper comprising the combination specified in claim 1 in which said element and housing, respectively, have fixed on the same side of each a plurality of associated major scales and a plurality of associated vernier scales each cooperating with one of said major scales, all of said scales being readable together on one side of said caliper.

5. A caliper comprising the combination specified in claim 4 in which said housing is formed with a sight opening provided with a plurality of coextensive major scales and said element is provided in said housing with a plurality of coextensive vernier scales each cooperating with one of said major scales.

6. A caliper comprising the combination specified in claim 5 in which said housing is formed at one side with said opening and at its opposite side with a light admitting opening and said major and vernier scales are of extinction type construction.

7. A caliper comprising the combination specified in claim 6 in which said major scales are spaced apart and provided therebetween with opaque numerical designation on a light transmitting ground and said vernier scales are spaced apart and provided therebetween with light transmitting numerical designations on an opaque ground.

8. A caliper comprising a frame having a reference surface at each of opposite ends thereof and formed with a guideway therein between said surfaces, a measuring element movable in said guideway with its opposite ends in measuring cooperation with said surfaces, respectively, means for moving said element, and said frame having a light-transmitting portion, a plurality of coextensive major scales on said guideway having light-transmitting division lines and a plurality of vernier scales on said element having light-transmitting division lines and superposed over said major scales for operation by light transmitted through said frame portion and said division lines to indicate the extent of movement of said element on said frame and element for indicating the extent of movement of said element.

9. A caliper comprising the combination specified in claim 8 in which one of said surfaces and cooperating element end are arranged for measuring a dimension within the extent of said frame and the other of said surfaces and cooperating element end are arranged for measuring a depth dimension extending from said other surface beyond said frame, said frame being provided with spring means for moving said element in each of opposite directions.

10. A caliper comprising the combination specified in claim 8 in which said frame and element are provided with expanded vernier scales with divisions smaller, by the size of the increment to be measured, than multiples of the divisions of said major scales for indicating the movement of said element.

11. A caliper comprising a frame having a reference surface at each of opposite ends thereof and formed with a guideway therein between said surfaces, a measuring element movable in said guideway with its opposite ends in measuring cooperation with said surfaces, respectively, spring means on said frame for moving said element in opposite directions, means for connecting said spring means in opposition to each other to free said element therefrom, and vernier means on said frame and element for indicating the extent of movement of said element.

12. A caliper comprising a frame having a reference surface and formed with a guideway, a measuring element slidable in said guideway for movement of an end thereof toward and from said surface, means for moving said element, a plurality of coextensive major decimal scales and a plurality of coextensive vernier decimal scales fixed directly on said frame and element for cooperation with one another, said scales being superposed on one another and of the extinction type having light-transmitting division lines visible by transmitted light, and said vernier scales having expanded divisions smaller, by the size of the increment to be measured, than multiples of the divisions of said major scales for indicating the movement of said element.

References Cited in the file of this patent

UNITED STATES PATENTS

| | | |
|---|---|---|
| 645,838 | Spalding | Mar. 20, 1900 |
| 715,851 | Osburn | Dec. 16, 1902 |
| 820,807 | Marbach | May 15, 1906 |
| 890,242 | Londick | June 9, 1908 |
| 1,357,323 | Jaques | Nov. 2, 1920 |
| 1,422,576 | Humphreys | July 11, 1922 |
| 1,663,217 | Ryan | Mar. 20, 1928 |
| 2,704,403 | Sawijalow | Mar. 22, 1955 |

FOREIGN PATENTS

| | | |
|---|---|---|
| 26,128 | Denmark | June 3, 1920 |
| 286,154 | Great Britain | Mar. 1, 1928 |
| 177,634 | Switzerland | Sept. 2, 1935 |
| 646,256 | Great Britain | Nov. 15, 1950 |